US009297299B2

(12) United States Patent
Stone

(10) Patent No.: US 9,297,299 B2
(45) Date of Patent: Mar. 29, 2016

(54) METHOD FOR SUPERHEATED GLYCERIN COMBUSTION

(71) Applicant: WSC THREE S.A., Santiago (CL)

(72) Inventor: Christopher S. Stone, Rio Bueno (CL)

(*) Notice: Subject to any disclaimer, the term of this patent is extended or adjusted under 35 U.S.C. 154(b) by 0 days.

(21) Appl. No.: 14/188,739

(22) Filed: Feb. 25, 2014

(65) Prior Publication Data

US 2014/0165944 A1  Jun. 19, 2014

Related U.S. Application Data

(63) Continuation-in-part of application No. 13/517,861, filed on Jun. 14, 2012.

(60) Provisional application No. 61/769,847, filed on Feb. 27, 2013, provisional application No. 61/496,887, filed on Jun. 14, 2011.

(51) Int. Cl.
*F02B 43/02* (2006.01)
*F02B 25/04* (2006.01)
(Continued)

(52) U.S. Cl.
CPC .......... *F02B 43/02* (2013.01); *F02B 25/04* (2013.01); *F02D 19/0647* (2013.01);
(Continued)

(58) Field of Classification Search
CPC .......... F02M 25/0228; F02M 21/0215; F02B 43/02; F02B 3/06; F02D 19/0647; F02D 19/10
USPC .......................................... 123/1 A
See application file for complete search history.

(56) References Cited

U.S. PATENT DOCUMENTS 4,892,561 A    1/1990  Levine
5,632,786 A *  5/1997  Basu et al. ............. 44/448
(Continued)

FOREIGN PATENT DOCUMENTS

GB    2413824    11/2005

OTHER PUBLICATIONS

Chapman et al. "Pilot Ignited Premixed Combustion fo Dimethyl Ether in a Turbodiesel Engine", Fuel Processing Technology, vol. 89, Issue 12, Dec. 2008, pp. 1262-1271.*
(Continued)

*Primary Examiner* — Lindsay Low
*Assistant Examiner* — Kevin Lathers
(74) *Attorney, Agent, or Firm* — Merek, Blackmon & Voorhees, LLC

(57) ABSTRACT

A method for superheated glycerin combustion (SGC) combines fumigation and SGC to effect greater fuel efficiency and reduce exhaust gas pollutants from a compression ignition engine such as a diesel engine. The invention utilizes the fumigant method by combining two gases (dimethyl ether and propane) which autoignite prior to the injection of the liquid glycerin water solution (GWS) fuel. This pre-combustion of the fumigant gases combined with the engine's compression of the combustion chamber gases is managed to attain a supercritical combustion chamber environment into which the liquid GWS fuel is injected. This targeted supercritical combustion chamber environment causes the GWS fuel to first vaporize the water which leaves the glycerin, prior to combustion, as highly dispersed monomers within the combustion chamber which autoignite similar to a "homogenous charge compression ignition" (HCCI) event resulting in significantly greater efficiency and negligible exhaust gas pollutants.

19 Claims, 1 Drawing Sheet

(51) Int. Cl.
*F02M 21/02* (2006.01)
*F02D 19/06* (2006.01)
*F02D 19/10* (2006.01)
*F02M 25/022* (2006.01)
*F02B 3/06* (2006.01)
*F02B 75/02* (2006.01)

(52) U.S. Cl.
CPC .......... *F02D 19/10* (2013.01); *F02M 21/0215* (2013.01); *F02M 25/0228* (2013.01); *F02B 3/06* (2013.01); *F02B 2075/025* (2013.01); *Y02T 10/121* (2013.01); *Y02T 10/32* (2013.01); *Y02T 10/36* (2013.01)

(56) References Cited

U.S. PATENT DOCUMENTS

| | | | |
|---|---|---|---|
| 6,095,102 A | 8/2000 | Willi et al. | |
| 6,145,495 A | 11/2000 | Whitcome | |
| 6,202,601 B1 | 3/2001 | Oullette et al. | |
| 6,206,940 B1 | 3/2001 | Weissman et al. | |
| 6,213,104 B1 | 4/2001 | Ishikiriyama et al. | |
| 6,286,482 B1 | 9/2001 | Flynn et al. | |
| 6,324,827 B1 | 12/2001 | Basu et al. | |
| 6,607,567 B1 | 8/2003 | Towfighi | |
| 6,901,889 B1 | 6/2005 | Ritter et al. | |
| 7,225,763 B2 | 6/2007 | Ritter et al. | |
| 2007/0089707 A1 | 4/2007 | Weber | |
| 2009/0183423 A1* | 7/2009 | Tavlarides et al. | 44/457 |
| 2013/0233941 A1 | 9/2013 | Cheiky et al. | |

OTHER PUBLICATIONS

Stone, Christopher, WO2014140869 international search report, 4 pages, Nov. 7, 2014.

Stone, Christopher, WO2012174190 international search report, 4 pages, Sep. 28, 2012.

* cited by examiner

METHOD FOR SUPERHEATED GLYCERIN COMBUSTION

CROSS REFERENCE TO RELATED APPLICATIONS

This application claims the benefit of U.S. Provisional Application 61/769,847, filed Feb. 27, 2013, entitled Method for Superheated Glycerin Combustion, which is incorporated herein by reference. This application is also a continuation in part of U.S. patent application Ser. No. 13/517,861, filed Jun. 14, 2012, which claims the benefit of U.S. Provisional Application 61/496,887, filed Jun. 14, 2011, each of which applications is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to internal combustion engines, and more particularly to an improved method for generating a supercritical combustion chamber environment for compression ignition engines, and specifically to the combustion of a glycerin/water solution.

BACKGROUND INFORMATION AND DISCUSSION OF RELATED ART

The inventor of the diesel engine, Rudolph Diesel—1897, used "natural gas" as a diesel engine fumigant fuel charge. Fumigation of a diesel engine is the addition of a gaseous fuel to the intake air charge of a diesel engine. Development of diesel engine fumigation techniques has continued, such as that disclosed in Ritter et al. U.S. Pat. No. 6,901,889.

The pre-heating of diesel fuel to improve combustion efficiency and reduce exhaust gas pollutants has been active since the 1930's. Hypergolic diesel combustion received significant attention in the 1980's. More recently Tavlarides et al. U.S. Pat. No. 7,488,357 and others disclose methods and apparatus which cause diesel fuel to become supercritical prior to injection into the combustion chamber.

U.S. Pat. No. 4,892,561 to Levine discloses fuels for internal combustion engines which contain at least 50% by weight of methyl ether.

U.S. Pat. No. 5,632,786 to Basu et al. describes a method for operating a spark ignition internal combustion engine utilizing an improved composition containing dimethyl ether and propane as fuel.

U.S. Pat. No. 6,095,102 to Willi et al. teaches a dual fuel engine which creates a substantially homogeneous mixture of gaseous fuel, air, and pilot fuel during a compression stroke.

U.S. Pat. No. 6,145,495 to Whitcome discloses a propane injection system for a diesel engine.

U.S. Pat. No. 6,202,601 to Ouellette et al. describes a method and apparatus for dual fuel injection into an internal combustion engine. A main fuel is ignited by a pilot fuel that is more readily flammable than the main fuel.

U.S. Pat. No. 6,206,940 to Weissman et al. teaches fuel formulations to extend the lean limit.

U.S. Pat. No. 6,213,104 to Ishikiriyama et al. discloses supplying fuel to an internal combustion engine in a supercritical state by raising the pressure and the temperature of the fuel above the critical pressure and temperature.

U.S. Pat. No. 6,286,482 to Flynn, et al. describes a premixed charge compression ignition engine with combustion control.

U.S. Pat. No. 6,324,827 to Basu et al. teaches a method of generating power in a dry low NOx combustion system.

U.S. Pat. No. 6,607,567 to Towfighi discloses propellant gas for tools operated by combustion power on the basis of combustible gases containing a mixture of 40% to 70% by weight of dimethyl ether, nitrous oxide and/or nitromethane, 8% to 20% by weight of propylene, methyl acetylene, propane and/or propadiene and 20% to 45% by weight of isobutane and/or n-butane.

U.S. Pat. Nos. 6,901,889 and 7,225,763 to Ritter, et al. describes a system and method to reduce particulate and NOx emissions from diesel engines through the use of a duel-fuel fumigation system.

U.S. Pat. No. 7,488,357 to Tavlarides, et al. teaches a composition of diesel biodiesel or blended fuel with exhaust gas mixtures or with liquid CO2. The composition is in a liquid state near the supercritical region or a supercritical fluid mixture such that it quasi-instantaneously diffuses into the compressed and hot air as a single and homogeneous supercritical phase upon injection in a combustion chamber.

UK Patent GB 2460996 discloses a combustion method for very low Cetane Number (CN) materials.

UK Patent GB 2460997 discloses a heated combustion air cycle to increase the efficiency of combustion of renewable oils and fats.

United States Pub. No. 2012/0318226 by applicant herein discloses a method for supercritical diesel combustion. The foregoing application is incorporated by reference in its entirety as if fully set forth herein.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

SUMMARY OF THE INVENTION

The method for superheated glycerin combustion (SGC) of the present invention combines fumigation and SGC to effect greater fuel efficiency and reduce exhaust gas pollutants from a compression ignition engine such as a diesel engine. The invention utilizes the fumigant method by combining two gases (dimethyl ether and propane) which autoignite prior to the injection of the liquid glycerin water solution (GWS) fuel. This pre-combustion of the fumigant gases combined with the engine's compression of the combustion chamber gases is managed to attain a supercritical combustion chamber environment into which the liquid GWS fuel is injected. This targeted supercritical combustion chamber environment causes the GWS fuel to first vaporize the water which leaves the glycerin, prior to combustion, as highly dispersed monomers within the combustion chamber which autoignite similar to a "homogenous charge compression ignition" (HCCI) event resulting in significantly greater efficiency and negligible exhaust gas pollutants.

Fumigation of a diesel engine air intake charge with a combustible gaseous fuel has always required that the injected liquid diesel fuel be the pilot ignition source initiating the combustion event. This allowed for accurate timing of the combustion event, reduction of the total diesel fuel consumed, and reduction of exhaust gas pollutants because the gaseous fuel combusts much more completely than the liquid diesel fuel.

Combustion of GWS in this SGC system causes the combustion of the glycerin to be a HCCI like combustion event but with the specific ability to be timed.

Liquid GWS, in a range of 60% to 40% water to glycerin or glycerin to water (at these percentages the standards for diesel fuel lubricity are achieved by the GWS), is injected into the combustion chamber at very high pressure to effect atomization of this liquid fuel. The result is a spray composed of droplets entering into the combustion chamber environment. There is an ignition delay time period as the liquid fuel droplets take on heat from the supercritical combustion chamber gases. First, the water of the GWS will vaporize resulting in a high number of radicals (OH, H2O2) being released in this gas phase of this superheated water. Once the water has vaporized and become superheated the glycerin molecules which have been dispersed in the GWS as monomers are left in the combustion space, more widely distributed in this space due to the turbulence created from the water vaporization, simulating gas phase glycerin. At the elevated temperature of the SGC and the abundant presence of radicals from the superheated water the glycerin will more thoroughly combust and not create the acrolein commonly associated with the combustion of glycerin. There are no fuel rich zones creating prompt NOx and the temperature of the GWS combustion event never reaches temperatures associated with the creation of thermal NOx. The efficiency of the system is increased greatly because the heat of combustion of the fumigant fuels, which normally accounts for up to 60% loss of efficiency, is trapped by the vaporization of the water into superheated steam. Thus providing additional gas expansion and pressure within the combustion space.

It is therefore an object of the present invention to provide a new and improved supercritical combustion chamber environment for compression ignition engines such as diesel engines to facilitate the combustion of GWS in these engines.

It is another object of the present invention to provide a diesel engine combustion chamber environment with improved fuel efficiency when combusting GWS.

A further object or feature of the present invention is a diesel engine combustion chamber environment that when combusting GWS will virtually eliminate NOx and soot emissions.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 3:
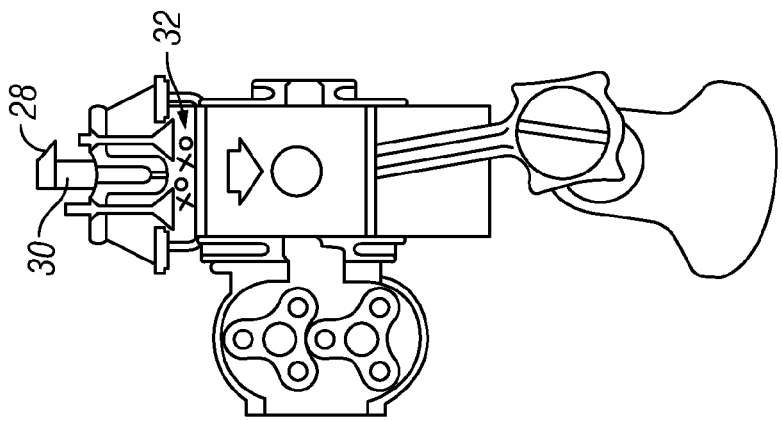
FIG. 3 is a cross sectional view of the engine at the beginning of the power stroke.

This invention applies to all compression ignition engines (CIE) which operate on diesel fuel No. 2, light fuel oil, biodiesel, specifically to allow these engines to efficiently and cleanly combust a GWS fuel. This invention can be readily retrofitted onto existing CIE with only slight modification between installations on two-stroke and four-stroke CIE. This invention can also be readily implemented into new CIE design and construction. The apparatus and method will change dependent on the "family of CIE" to which it is applied. "Family of CIE" is intended to categorize as functional inclusionary units similar CIE. The broadest category is the division between two and four-stroke CIE. The method and apparatus will vary when adopted for use on the different families of CIE. Rotational speed, low, medium, high will be subfamilies, as will displacement volume of the combustion chamber.

The principle of this novel combustion method will remain the same. This principle is the use of a fumigant fuel blend to establish a supercritical fluid/gas environment within the combustion chamber of the CIE prior to the injection of the liquid GWS fuel. This supercritical fluid/gas environment has a target pressure of not less than 600 psi, and preferably over 800 psi being expressed in the constant volume space (CVS) of the combustion chamber prior to the injection of the liquid diesel fuel. CVS is generally accepted to be the combustion space compressed by the piston commencing at 10° BTDC (before top dead center, the position of the piston prior to reaching TDC) and ending at 10° ATDC (after top dead center, the position of the piston after passing TDC). To achieve this pressure and corresponding temperature, 1,000° F. to 1,400° F. (and preferably 1,200° F. to 1,400° F.), the components of the inventive method and apparatus will be adapted to perform for each family of CIE. The following detailed description is an embodiment of this invention as applied to a two-stroke uniflow medium speed CIE with a displacement of greater than 500 cubic inches per cylinder. The liquid GWS fuel is injected by the existing mechanical unit injectors of this engine.

This type of CIE utilizes either a Roots blower or a turbo charger to compress intake air into air chambers surrounding the lower portion of the cylinder assemblies, which comprise these engines power assemblies. These air boxes have access doors to which the fumigant fuel injector will be affixed and aimed at the nearest air intake port supplying the cylinder. This injector will inject liquid fumigant fuel supplied to it by a pressure vessel fuel tank which has an internal fuel pump to boost the tank pressure so that the fuel will remain liquid throughout its route to the injector. The pulse of the injector will be controlled by a device, which, at a minimum, constantly monitors the following engine parameters: the engine rpm to establish a timing sequence for the individual injection pulse, to be timed to pulse just as the intake ports are revealed by the piston and the air charge begins to enter the combustion chamber; and the continuous reading of the individual (e.g., every fourth cylinder) pressure developed during the entire engine cycle. This precise pressure information will be interpreted by a controller, which in turn will vary the fumigant fuel injector pulse duration to provide more or less fumigant fuel to the combustion chamber. The target is a minimum pressure of 800 psi being expressed in the CVS prior to the injection of the GWS fuel. At 800 psi and the relative temperature, 1,200° F. to 1,400° F., over 90% of the gases in the CVS are supercritical. $H_2O$ and $CO_2$ will not be supercritical but $N_2$, $O_2$, $OH$, $H_2O_2$, and $CO$ will all be supercritical.

The unit injector for the diesel fuel will be modified to inject the GWS at TDC. The pulse duration of the unit injector will also be shortened. Because the atomized spray of the GWS fuel will encounter significantly higher combustion chamber pressure it will experience higher shear force, greatly reducing the size of the GWS fuel droplets. At the time of injection these droplets will be innervated by the supercritical fluids/gases, which comprise the supercritical combustion chamber environment. As supercritical fluid/gases these substances become hyper-solvents.

The highly atomized GWS fuel droplets are not only heated from the outside but also from the inside by both conduction and radiation. Supercritical substances release over 60% of their heat energy as radiant energy. The water vaporization is instantaneous creating superheated steam, lowering the temperature and increasing the relative pressure but more importantly increasing the mass heat transfer into the remaining glycerin. The combustion of the glycerin, well before 15 ATDC, is dispersed throughout the combustion chamber and autoignites without creating a flame front. Typical diesel fuel combustion is timed for maximum heat release to occur in the CVS. The combustion event typically initiates just prior to the piston achieving 10° BTDC and continues to its high heat release thru 10° ATDC. Functionally from the combustion point of view, this sequence allows the diesel fuel to be reasonably combusted prior to the retained heat in the combustion chamber dropping below the temperature necessary to support combustion, about 60° ATDC. From a mechanical and heat management perspective this timing is wasteful and contributes to greater formation of NOx compounds. Mechanically, timing high heat release when the piston relationship to the crankshaft is essentially a vertical line is the time of lowest mechanical advantage and least possible transference of energy to aid in the rotation of the crankshaft. This high heat release is essentially stalled for almost a third of its active combustion sequence. The effect of this stall is to allow the heat to sink into the most readily available heat sinks, $N_2$ and $O_2$, 75% and 15% respectively of the combustion gases. This stalling of the combustion events mechanical transference and the companion sinking of heat into $N_2$ creates CIE inefficiency and increased amounts of NOx in the exhaust gas.

In this inventive method, the combustion chamber gases are supercritical and superheated which allows the timing of the GWS fuel combustion event to be delayed to a target of high heat release at 20° ATDC. At this crank angle the transference of energy is more mechanically favorable and allows the combustion chamber space to grow much more quickly than in typical CIE combustion, thus relieving the peak heat sinking and formation of significant NOx compounds.

This supercritical/superheated combustion chamber environment is created by combining the compression of the combustion chamber gases with a sequence of pre-GWS fuel injection combustion events and the creation of superheated steam expressed from the GWS fuel. The fumigant fuel injected into the air intake is a blend, and preferably a custom blend, blended for each CIE family, of propane and dimethyl ether (DME). These fuels are miscible and combined in a single pressure vessel, blended specifically for the CIE family being served, but have been determined to range from 1-20% DME and 80-99% propane. In this example the fumigant fuel is injected as a liquid. In the case of high rotational speed CIE family of engines the fumigant fuel would be injected as a gas for either two-stroke or four-stroke engines. Due to the low boiling point of the fumigant fuel components (−44° F. for propane and −11° F. for DME), these liquid fuels will vaporize in the early stages of the compression stroke and quickly homogenize with the air charge as the compression of the charge gases increases. At approximately 30 to 20° BTDC the DME will autoignite. This autoignition triggers the ignition of the propane. The fumigant fuel combustion is a two stage combustion so that the larger of the combustion events, the propane combustion, occurs just as the CVS is being entered into. This is done to lessen the backpressure on the piston. The DME combustion is principally a means to trigger the propane combustion.

The combustion chamber pressure will be continuously read by an in-cylinder pressure sensor, e.g. one for every four cylinders. The sensors output is interpreted by a controller, which increases or decreases the pulse duration of the fumigant fuel injector to best manage the fumigant fuel flow into the combustion chamber, to attain the target supercritical pressure prior to the GWS fuel injection.

Figure 2:
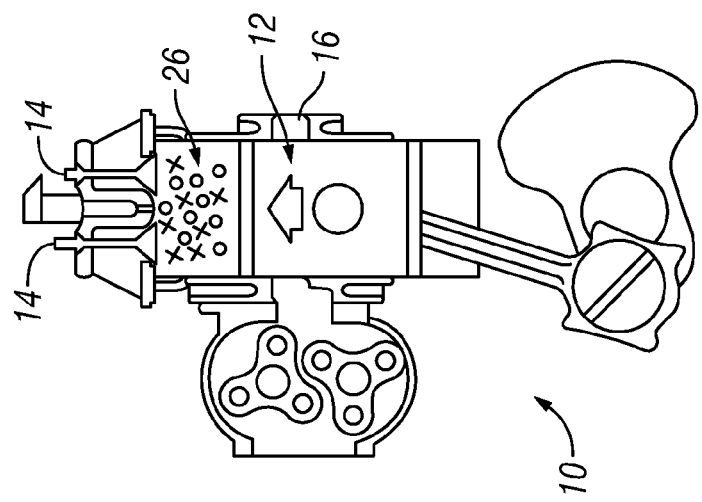
FIG. 2 is a cross sectional view of the engine at the beginning of the compression stroke.
Figure 1:
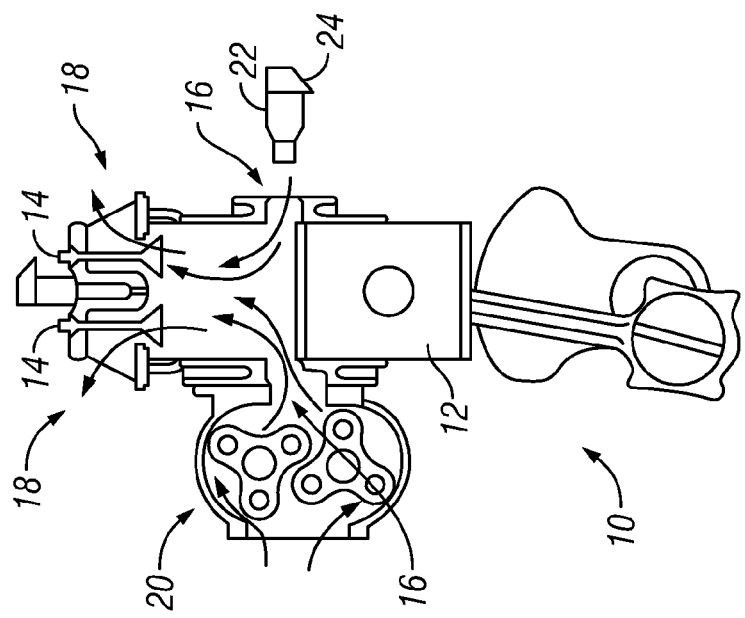
FIG. 1 is a cross sectional view of a two-stroke diesel engine with the piston in the neutral exhaust/intake position.

Referring now to FIGS. 1 through 3, wherein like reference numerals refer to like components in the various views, there is illustrated therein a new and improved method for SGC.

The drawing figures illustrate a cross sectional view of a uniflow, two-stroke diesel engine. The operating principles apply as well to a four-stroke diesel engine, the difference being that the fumigant fuel injectors would be mounted on the four-stroke engines air intake manifold as close to each cylinders intake valves as possible. The fumigant fuel injector depicted is for application of the inventive system to existing diesel engines. Newly constructed engines could implement the system, optionally, by placing the fumigant fuel injector as a direct injection component, pulsing directly into the combustion chamber.

FIG. 1 depicts a two-stroke diesel engine 10 with the piston 12 at the point in which the piston is in the neutral exhaust/intake position. The exhaust valves 14 have opened just before the piston's descent which reveals the air intake ports 16 to allow the exhaust gas from the previous combustion to begin exiting thru the exhaust ports 18. As the piston continues to descend it reveals the air intake ports 16, which have been pressurized by the air compressor 20. All modern diesel engines utilize some form of air compressor, such as a blower or turbocharger, to force air into the combustion chamber of the engine. Fresh intake air floods into the combustion chamber aiding in pushing the exhaust gases from the previous combustion out through the exhaust ports. Just as the fresh air begins to enter the combustion chamber the fumigant fuel injector 22, which is mounted and aimed directly at one of the air intake ports, pulses, releasing a specific volume of mixed fumigant fuel supplied by the fumigant fuel tank 24.

In low and moderate speed diesel engines (e.g., under 1200 rpm), the fumigant fuel will be injected as a liquid. High speed diesel engines will have the fumigant fuel injected as a gas to assure that complete vaporization and homogenization occurs prior to autoignition of the fumigant fuel. The fumigant fuel is a mixture of propane and dimethyl ether held in a common pressurized tank 24. Propane vaporizes at −44° F. and dimethyl ether vaporizes at −11° F., essentially both permanent gases at standard operating conditions.

FIG. 2 is a cross sectional view of the engine at the beginning of the compression stroke. The piston 12 continues to rise, closing off the air intake ports 16, the exhaust valves 14 have closed, and the compression stroke begins. As the piston slides towards the exhaust valves the combustion chamber gases are compressed and begin to rise in temperature. All diesel engines are designed so that the compression of these gases will increase in temperature well beyond the autoignition temperature of diesel fuel, prior to the piston entering the CVS. Typical diesel fuel compression ignition occurs as the diesel fuel is injected into the combustion chamber, initiating from approximately 16° BTDC. Operating with this inventive system the piston compresses the fumigant fuel air mixture 26 causing the fumigant fuel to vaporize and homogenize with the air charge. At approximately 30 to 20° BTDC the dimethyl ether will have achieved autoignition temperature and combust. This combustion will cause the propane to combust, which combined with the compression of the gases by the piston, will result in a supercritical combustion chamber environment which additionally causes the water of the GWS fuel to first become superheated steam prior to the glycerin autoignition.

FIG. 3 is a cross sectional view of the engine at the beginning of the power stroke, and the supercritical combustion chamber environment 32, with a CVS pressure of not less than 800 psi. At this pressure and corresponding temperature, 1,200 to 1,400° F., all the gases in the combustion chamber (except H2O and CO2) are supercritical fluids. At TDC the GWS fuel from GWS fuel tank 28 is injected into this supercritical environment through typical diesel fuel injectors 30.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

I claim:

1. A method for superheated glycerin combustion comprising:
    providing a compression ignition engine having a combustion chamber;
    providing a fumigant fuel charge to the combustion chamber to autoignite and create a supercritical environment in the combustion chamber prior to the injection of a fuel comprising water and glycerin; and
    injecting the water and glycerin fuel into the combustion chamber, wherein the water and glycerin fuel is a superheated fluid after injection into the combustion chamber and prior to combustion.

2. The method for superheated glycerin combustion of claim 1 wherein the fumigant fuel charge comprises a mixture of dimethyl ether and propane.

3. The method for superheated glycerin combustion of claim 1 wherein the fumigant fuel charge comprises 1-20% dimethyl ether and 80-99% propane.

4. The method for superheated glycerin combustion of claim 1 wherein the step of providing a fumigant fuel charge comprises injecting a fumigant fuel into an air intake port on the engine.

5. The method for superheated glycerin combustion of claim 4 wherein the fumigant fuel charge is injected as a liquid.

6. The method for superheated glycerin combustion of claim 4 wherein the fumigant fuel charge is injected as a gas.

7. The method for superheated glycerin combustion of claim 1 wherein the glycerin fuel is injected into the combustion chamber after TDC.

8. The method for superheated glycerin combustion of claim 1 wherein the glycerin fuel is injected into the combustion chamber at 5° to 10° ATDC.

9. The method for superheated glycerin combustion of claim 1 wherein the supercritical environment has a constant volume space of at least 800 psi prior to the injection of the glycerin fuel.

10. The method for superheated glycerin combustion of claim 1 wherein the supercritical environment has a temperature of 1,200° F. to 1,400° F.

11. The method for superheated glycerin combustion of claim 1 wherein the water/glycerin fuel combusts at approximately 20° ATDC.

12. The method for superheated glycerin combustion of claim 1, wherein the primary fuel is a water and glycerin solution.

13. A method for superheated glycerin combustion (SGC) in a compression ignition engine, the method comprising:

combining two gases which autoignite prior to the injection of the liquid glycerin water solution (GWS) fuel, herein the two gases are dimethyl ether and propane;

managing the pre-combustion of the fumigant gases combined with the engine's compression of the combustion chamber gases to attain a supercritical combustion chamber environment into which the liquid GWS fuel is injected.

14. The method of claim 13 wherein the targeted supercritical combustion chamber environment causes the GWS fuel to first vaporize the water which leaves the glycerin, prior to combustion, as highly dispersed monomers within the combustion chamber which autoignite.

15. A method for supercritical combustion comprising:
providing a compression ignition engine having a combustion chamber;
providing a fumigant fuel charge to the combustion chamber conditioned to autoignite to create a supercritical environment in the combustion chamber prior to the injection of a fuel comprising glycerin, wherein said fuel is not the fumigant fuel; and
injecting the fuel into the combustion chamber after the chamber has been condition to a supercritical environment, wherein the fuel is raised from a non-supercritical fluid to a supercritical fluid in the combustion chamber prior to combustion.

16. The method for supercritical combustion of claim 15, wherein the fumigant fuel charge comprises a mixture of dimethyl ether and propane and wherein the fumigant fuel charge comprises 1-20% dimethyl ether and 80-99% propane.

17. The method for supercritical combustion of claim 15, wherein the step of providing a fumigant fuel charge comprises injecting a non-diesel fumigant fuel into an air intake port on the engine.

18. The method for supercritical combustion of claim 15, wherein the supercritical environment has a constant volume space of at least 800 psi prior to the injection of the fuel and wherein the supercritical environment has a temperature of 1,200° F. to 1,400° F.

19. The method for supercritical combustion of claim 15, wherein the fuel comprises one of the group of glycerin, diesel fuel No. 2, light fuel oil, biodiesel, water emulsified diesel fuels, blends of diesel surrogates, light fuel oil emulsions, and a blend of these fuels.

* * * * *